STRIP FEEDING DEVICE

Filed March 24, 1949 3 Sheets-Sheet 1

INVENTORS
PERCY G. STIMSON
JOHN T. DAVIDSON
BY Tom Walker
ATTORNEY

Sept. 17, 1957 P. G. STIMSON ET AL 2,806,692

STRIP FEEDING DEVICE

Filed March 24, 1949 3 Sheets-Sheet 2

INVENTORS
PERCY G. STIMSON
JOHN T. DAVIDSON
BY Tom Walker
ATTORNEY

Sept. 17, 1957

P. G. STIMSON ET AL 2,806,692

STRIP FEEDING DEVICE

Filed March 24, 1949

3 Sheets-Sheet 3

INVENTORS
PERCY G. STIMSON
JOHN T. DAVIDSON
BY Tom Walker
ATTORNEY

United States Patent Office 2,806,692
Patented Sept. 17, 1957

2,806,692

STRIP FEEDING DEVICE

Percy G. Stimson and John T. Davidson, Dayton, Ohio, assignors to The Standard Register Company, Dayton, Ohio, a corporation of Ohio Application March 24, 1949, Serial No. 83,196

11 Claims. (Cl. 271—2.4)

This invention relates to strip feeding mechanism and more particularly to a feeding mechanism for use with addressograph machines and similar imprinting equipment wherein a strip of series connected detachable record forms are fed past an imprinting position in step by step movements of varying extent.

The present equipment is designed primarily for use in connection with multiple listings upon a single record form, the strip being advanced a single line space for each impression. Upon completing the recording of record indicia on each form length of the record strip, the mechanism then advances the strip so as to bring the succeeding form length into recording position, at which time the heading imprint is accomplished. Subsequently thereto, the strip is again automatically advanced to bring the record portion of the form into recording position to receive successive impressions thereon in line space relation.

The instant disclosure is a further improvement and development of the structure disclosed and claimed in copending application of Davidson et al., Serial No. 62,798, filed December 1, 1948, now Patent Number 2,700,334.

The feeding mechanism disclosed herein represents a considerably simplified structure and also provides smoother strip feeding operation without any significant or noticeable backlash or overthrow of the control mechanism and associated strip feeding device. Such beneficial results are achieved by the use of a separate power supply for the feeding mechanism, which power supply is energized in timed relation with the imprinting machine and slightly in advance of the feeding operation.

Simplification of the structure results in considerably less weight and provides a feeding mechanism which may be installed upon or removed from an imprinting machine without the need for skilled mechanics or servicemen.

Thus, the object of the invention is to improve the construction as well as the means and mode of operation of strip feeding mechanisms, whereby such mechanism may not only be more efficient and satisfactory in use, automatic in operation, uniform and accurate in action, but having relatively few parts and be unlikely to get out of repair.

A further object of the invention is to provide a strip feeding mechanism which is substantially universal in nature, being adaptable to a wide variety of feeding operations and imprinting machines.

A further object of the invention is to provide a strip feeding mechanism which automatically advances the strip different distances during successive operations, depending upon the type of record indicia imprinted thereon.

A further object of the invention is to provide a strip feeding mechanism which is substantially automatically controlled by the imprinting mechanism to which it is attached.

A further object of the invention is to provide an independent source of power for the strip feeding mechanism which is automatically energized in timed relation with the imprint mechanism.

A further object of the invention is to provide a strip feeding mechanism of the step by step type in which the strip is subjected to relatively smooth "start" and "stop" impulses.

A further object of the invention is to provide in a strip feeding mechanism means for energizing the strip feeding device prior to actual operation thereof.

A further object of the invention is to provide in a strip feeding mechanism means for deenergizing the strip feeding device prior to actual arrest thereof.

A further object of the invention is to provide a strip feeding mechanism which is relatively light in weight and easily installed or removed from the imprinting machine.

A further object of the invention is to relieve the load placed upon the power means of the imprinting machine, in that the instant strip feeding mechanism includes its own power source.

A further object of the invention is to provide a strip feeding mechanism having the advantageous structural features, the inherent meritorious characteristics and the mode of operation herein set forth, or their equivalents.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In the drawings, wherein is illustrated one but obviously not necessarily the only form of embodiment of the invention, Fig. 1 is a perspective view of an imprinting machine with the present feeding mechanism attached thereto.

Like parts are indicated by similar characters of reference throughout the several views.

Figure 1:
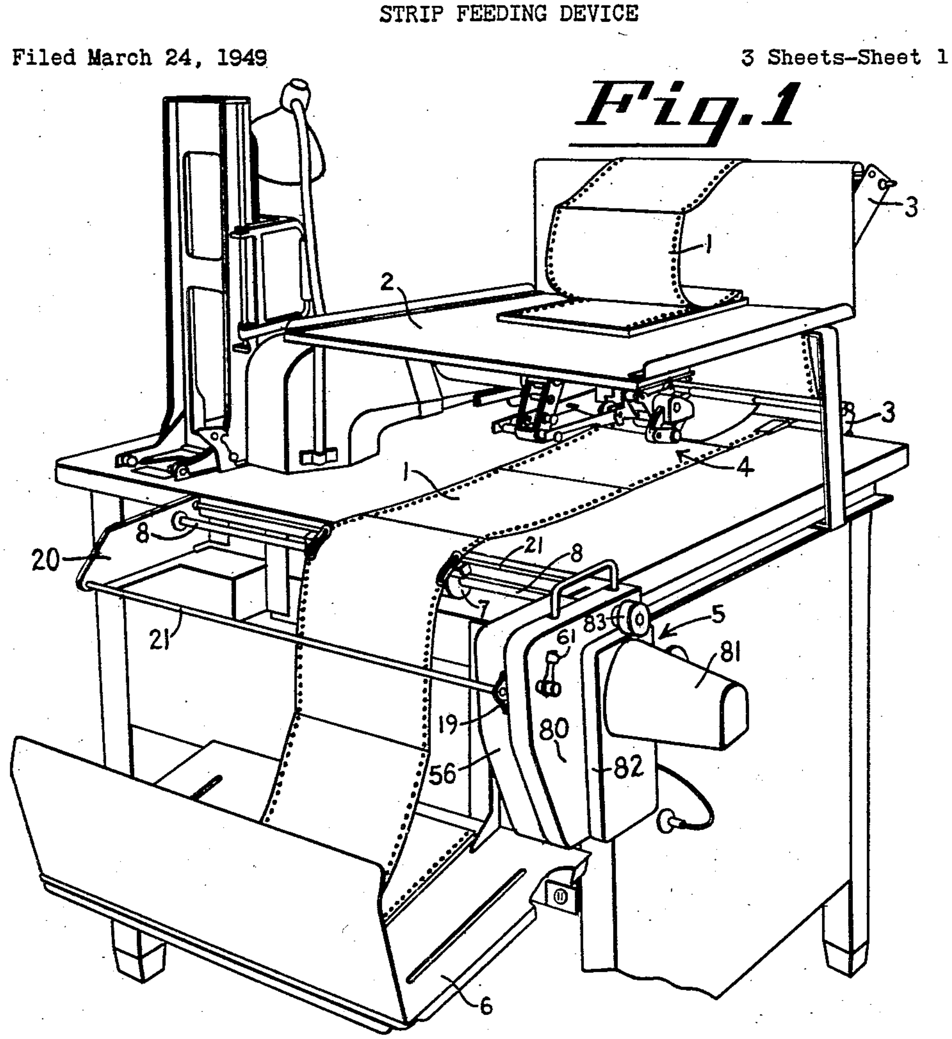

Referring to the drawings, there is shown in Fig. 1 a conventional imprinting machine to which a strip feeding mechanism embodying the present invention is attached. A continuous record strip, or assembly of superposed record strips 1, are supported upon a shelf 2, from which they are drawn about guide members 3 past an imprinting position 4 by the strip feeding mechanism, generally designated as 5. The imprinted record strips are then collected in a receiving tray 6 from which they may be removed as desired.

The present unit is designed primarily for the feeding of marginally punched record strips by what is now commonly known as pin wheels. The pin wheels 7 are supported upon pin wheel shaft 8 for unison rotary motion therewith. Thus, upon rotation of the pin wheel shaft, the strips of series connected record forms are progressively advanced past imprinting position a distance proportional to the amount of rotation of the shaft 8.

The pin wheel shaft 8 is driven through a series of gears 9, 10, 11 and 12 (Fig. 5), gears 10 and 11 comprising a compound gear mounted upon stub shaft 13 carried by lever 14, pivotally mounted upon pin wheel shaft 8. Gear 12 is the primary drive gear, meshing with gear 11 with which gear 10 rotates in unison. Gear 9 on the pin wheel shaft 8 meshes with gear 10 to transmit rotary motion of the primary gear 12 to the pin wheel shaft 8 and pin wheels 7 mounted thereon.

Figures 5, 6:
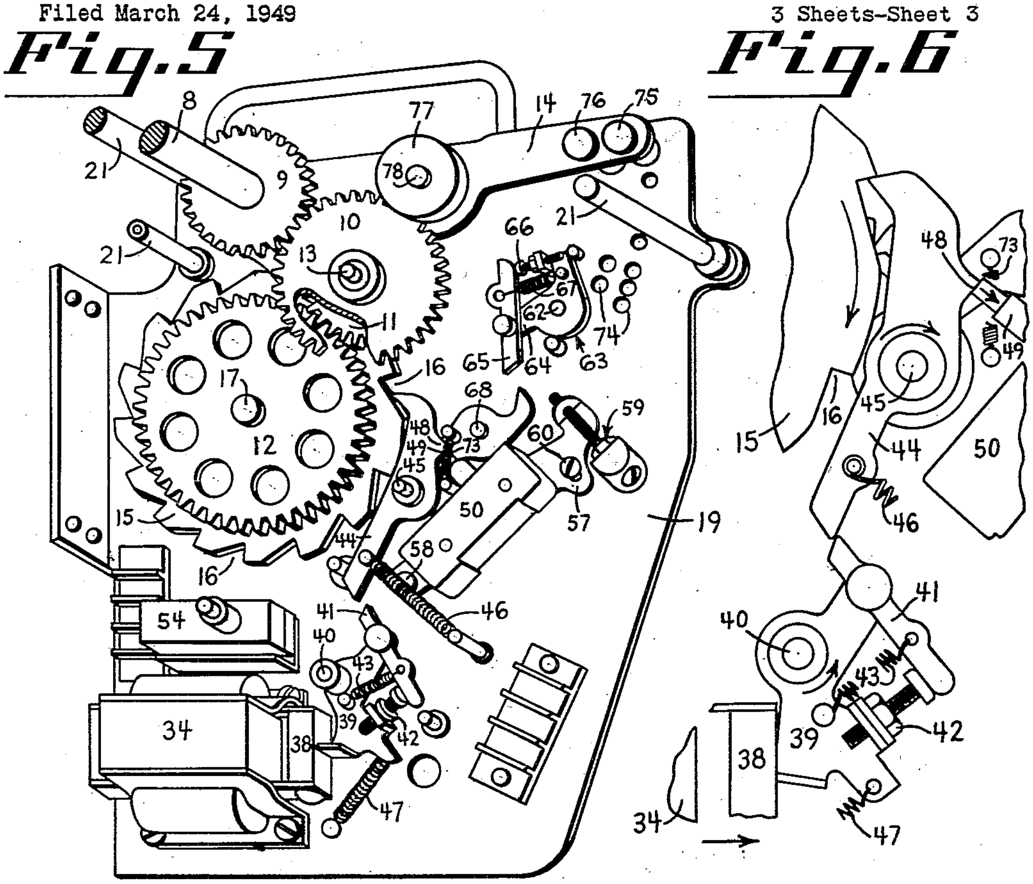
Fig. 5 is a view showing the back of the unit shown in Figs. 2 and 3.
Fig. 6 is an enlarged fragmentary view showing a portion of the mechanism in Fig. 5 in a different position.

Secured to the back of gear 12, as seen in Fig. 5, is a control disc 15 which rotates in unison with the gear and serves as the primary control for the strip feeding mechanism, the distance between the notches 16 therein determining the extent of strip feeding operation during each operation of the strip feeding device. Gear 12 and disc 15 are concentrically mounted upon stub shaft 17 mounted within bearing 18 supported in side plate 19.

The opposite end of the strip feeding mechanism is supported in side plate 20, the entire assembly being held together by tie bolts 21. The pin wheel shaft 8 is supported in the opposite side plates 19—20.

Figure 2:
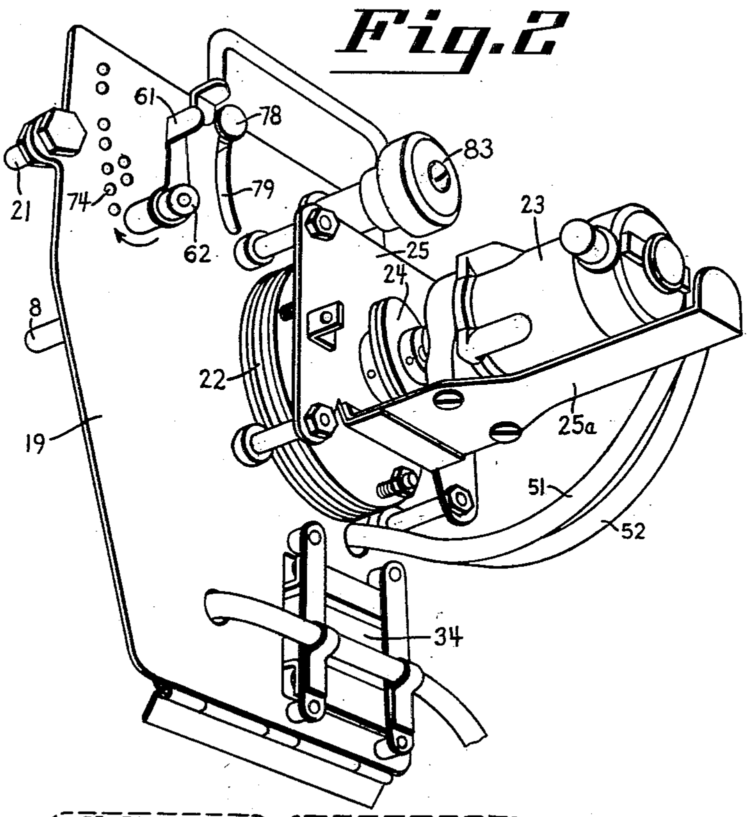
Fig. 2 is a perspective view of the power supply portion of the mechanism shown in the right foreground of Fig. 1, with the covers removed.

To the opposite end of shaft 17 is secured one member of a friction clutch 22 (Fig. 2). The cooperating member of the clutch 22 is secured to the shaft of motor 23 through a coupling 24. The motor 23 and outboard end of clutch 22 are supported upon a supplemental frame 25—25*a* mounted in spaced relation to side plate 19.

Figure 8:
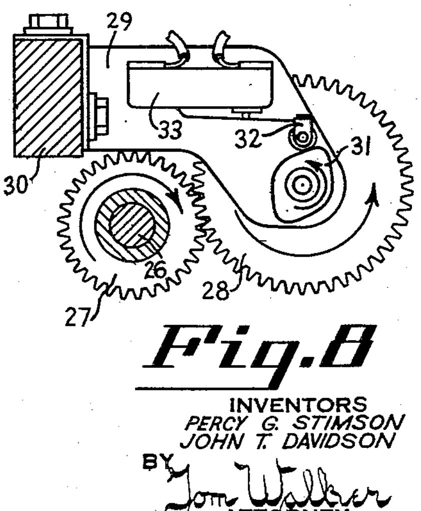
Fig. 8 shows the mechanism for controlling the operation of the strip feeding mechanism in timed relation with the imprinting machine.

The motor 23 is intermittently energized in timed relation with the operation of the imprinting machine through operation of the control unit shown in Fig. 8. Drive shaft 26 (Fig. 8) is a part of the imprinting machine, which shaft makes one complete revolution after every imprinting operation thereof. Shaft 26 rotates only during the advancement of the imprinting plates or other legend bearing plates by the imprinting machine and is at rest during the actual imprinting operation. Thus, by means of such shaft the strip feeding mechanism is energized only during the non-imprinting operation of the imprinting machine. Mounted on shaft 26 is a gear 27 meshing with gear 28 carried by a bracket 29 secured to a part 30 of the imprinting machine frame. Gear 28 is so proportioned that it makes but one-half of a revolution for each revolution of gear 27, hence a double or two-lobed cam 31 is mounted for unison rotation with the gear 28. When assembled, gear 28 and cam 31 are so positioned with respect to gear 27 and cam follower 32 that initial motion of gear 27 will cause cam 31 to raise the follower 32, thereby closing normally open switch 33.

Figure 9:
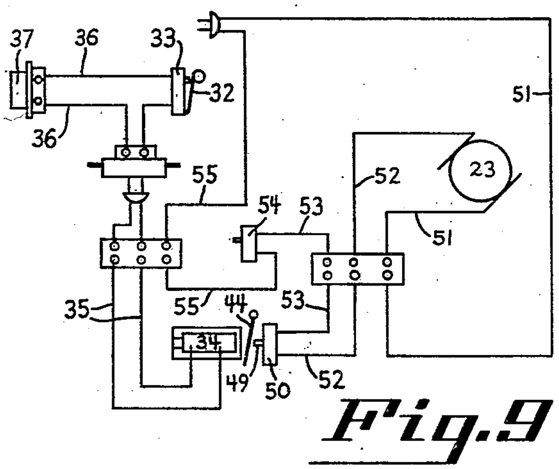
Fig. 9 is a schematic wiring diagram showing the various controls embodied in the instant strip feeding mechanism.

As will be seen in Fig. 9, closing of switch 33 energizes solenoid 34 through conductors 35 and 36, conductors 36 being connected with an outside source of electrical energy by means of a socket 37.

Referring to Figs. 5 and 6, energization of solenoid 34 causes its armature 38 to move outwardly (in the direction of the arrow in Fig. 6) into engagement with a pawl tripping assembly 39, oscillating such assembly in a counterclockwise direction about its pivot point or supporting stud 40. The pawl trip 39 is in the form of a "bell crank" lever, the upper arm having pivotally mounted thereon a pusher member 41. The member 41 is adjustably mounted upon its pivot by movement of the adjustable abutment 42 against which the member 41 is maintained under influence of a retractile spring 43.

Upon movement of the pawl tripping assembly 39 in a counterclockwise direction, the tip or nose of member 41 engages the tail portion of a spacing disc pawl 44, oscillating such pawl in a clockwise direction about its mounting stud 45. The nose of member 41 and the cooperating tail portion of pawl 44 are so shaped that the member 41 clears the pawl 44 after initial engagement therewith, thereby leaving the pawl 44 free for return to its normal position under influence of retractile spring 46.

Figure 3:
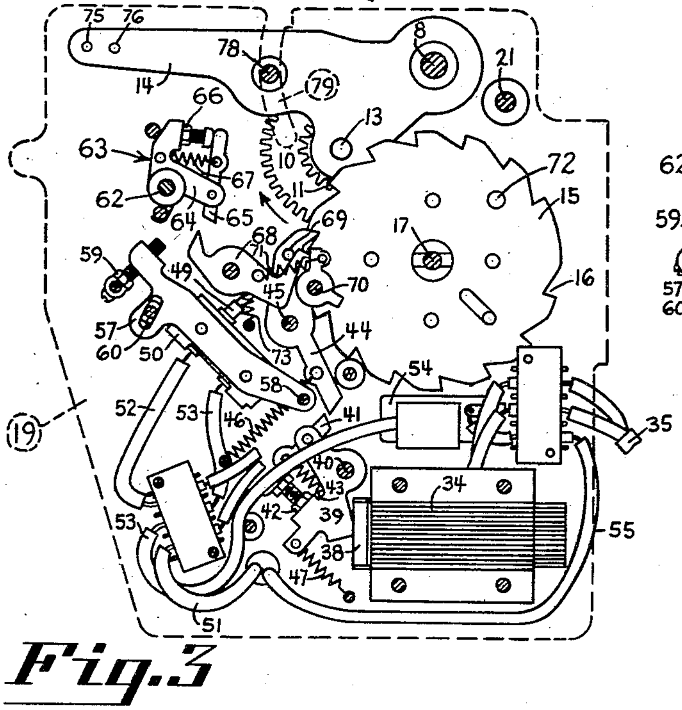
Fig. 3 is a phantom plan view showing the mechanism on the opposite side of the plate of Fig. 2, with the plate being shown in dotted lines.

The various parts are shown in normal or "rest" position in Fig. 3, while in Fig. 6 the parts are shown partially operated, i. e., the member 41 is just about to clear the tail of pawl 44, which clearance occurs simultaneously with the withdrawal of the upper arm of the pawl 44 from the notch 16 in disc 15. In Fig. 5 the parts are shown as they are again approaching normal or "rest" position, the pawl tripping assembly 39 having returned to normal position under influence of retractile spring 47 upon deenergization of solenoid 34 which occurs as the high point of cam 31 passes the follower 32 permitting switch 33 to return to its normally open position. Spacing disc pawl 44 is shown in Fig. 5 as being in engagement with the surface of the disc 15 and entering a succeeding notch 16 therein. Retractile spring 46 immediately brings pawl 44 into engagement with the surface of the disc upon clearing the preceding notch 16, since the instant that the pawl is withdrawn from a notch, the disc 15 begins to rotate.

Prior to full withdrawal of pawl 44 from disc 15 under influence of the pawl tripping assembly 39, the motor 23 is energized by engagement of a projection 48 on pawl 44 with a plunger 49 controlling operation of a switch 50. Referring to Fig. 9, the motor 23 is energized through a circuit comprising conductors 51—52, switch 50, conductor 53, switch 54 and conductor 55. Conductors 51—55 are plugged into any convenient electric current service outlet to supply electrical energy to the motor 23.

Switch 54 is a cover operated normally open switch which is engaged and closed by cover member 56 (Fig. 1) when placed in proper position. Thus, when cover member 56 is removed from the mechanism it is impossible for the feeding mechanism to operate, thereby protecting the operator from accidental injury and also protecting the mechanism from injury resulting from the entrance of foreign material into the unit.

Motor control switch 50 is also adjustably mounted upon the side plate 19 by means of a mounting bracket 57 pivotally supported upon plate 19 as at 58. Bracket 57 is adjusted to desired position by means of a screw type abutment 59 and locked in adjusted position by clamp screw 60.

From the above description of means for energizing motor 23, it will be understood that the motor is energized prior to complete withdrawal of the pawl 44 from disc 15. Until complete withdrawal of the pawl rotation of the disc 15 under influence of the energized motor 23 is prevented. At the moment of pawl withdrawal, however, the motor has been fully energized and has attained full running speed, whereby the disc upon release is immediately picked up with a smooth action and practically instantaneously achieves full speed operation. Rotation of the motor 23 prior to release of the disc 15 is absorbed by the friction clutch 22 interposed between the motor and disc 15.

Now referring to Fig. 5 wherein the mechanism is again approaching normal or "rest" position, the pawl 44 has moved approximately half way through its entry motion into a succeeding notch 16. In this position the projection 48 thereon has moved away from plunger 49 of switch 50, permitting the switch to return to its normally open position. The energizing circuit for the motor 23 is thereupon broken and the motor gradually comes to rest with a coasting or free motion. The disc 15 likewise coasts into full engagement with the pawl 44 which arrests further movement of the disc until a succeeding operation is initiated upon closure of the control switch 33 by operation of the plate feeding mechanism of the imprinting machine.

Energization of the motor 23 in advance of the actual strip feeding operation and deenergization of the motor prior to actual completion of the strip feeding operation results in a very smooth feeding motion, having the full benefit and advantages of a continuous feed, yet being an intermittent step by step feeding operation. By permitting the disc to coast into engagement with the pawl 44, all backlash or rebound is eliminated, thus leaving the mechanism in proper position to immediately start a succeeding feeding operation while simultaneously providing exact registration of the record receiving areas on the strip with the imprinting position. Preenergization of the motor permits the mechanism to be in readiness to rapidly advance the strip the desired distance immediately upon release of the disc 15 by the pawl. Thus, all sluggishness or delayed feeding is eliminated, which is quite important in a mechanism of this character in view of the rapidity with which the imprinting machine operates to advance a printing plate into position for a succeeding imprinting operation.

The particular arrangement of parts shown herein does not provide for automatic compensation of the strip feeding mechanism, thereby permitting automatic advancement of the record strip subsequent to the completion of one series of imprints through a continuous movement until brought into position where the first line of a succeeding form is in registry with the imprinting position. The mechanism to be hereinafter described, however, provides for manual compensation of the strip feeding mechanism and it may be easily converted to automatic operation by the addition of appropriate actuating mechanism such as shown in the copending Davidson et al. application heretofore mentioned.

Figure 4:
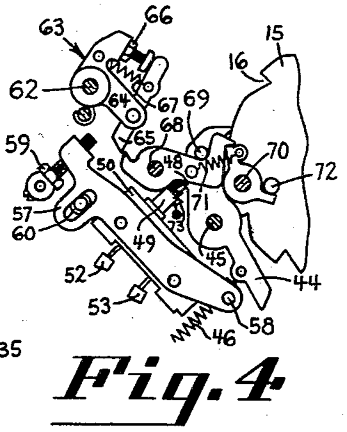
Fig. 4 is a fragmentary view showing a portion of the mechanism of Fig. 3 in a different position.

When it is desirable to advance the strip to the first impression receiving position of a succeeding form, lever 61 (Fig. 2) is depressed, thereby rotating shaft 62 upon which the lever is mounted in a clockwise direction, as viewed in Fig. 2. Now, referring to Figs. 3 and 4, movement of shaft 62 in a clockwise direction causes actuation of a pawl tripping mechanism generally indicated at 63. Such mechanism comprises a bell crank lever 64 upon one arm of which is pivoted a trip member 65. The opposite end of the trip member is maintained in engagement with an adjustable abutment 66 under influence of retractile spring 67.

Clockwise movement of the pawl tripping mechanism 63 brings the tail of trip member 65 into temporary engagement with one end of a pawl lift lever 68. Lift lever 68 is pivotally mounted upon plate 19 with its opposite end projecting into overlapping engagement with a stud 69 carried by the spacing disc pawl 44. The lift lever has camming engagement with the stud 69 to withdraw the pawl 44 from engagement within a notch of the disc 15 upon oscillation of the lift lever 68 under influence of the pawl tripping mechanism 63.

Upon movement of the lift lever 68 into operated position in relation to stud 69 (Fig. 4) the lever is maintained in such position by engagement of one end of a pivoted catch member 70 beneath the overhanging shoulder of the lift lever. Catch 70 is urged toward lever locking position and maintained therein under influence of spring 71.

The pawl tripping mechanism 63 is so designed in relation to lift lever 68 that the tripping mechanism may pass the end of the lever after temporary engagement therewith. Thus, even though the tripping mechanism be held in operated position (see Fig. 4) lift lever 68 and spacing disc jawl 44 are free for return to normal position in timed relation with the operation of the strip feeding mechanism.

To return the spacing disc pawl 44 into normal position wherein it is free for engagement within successive notches 16 of the disc 15, a stud 72 is placed upon the disc 15 in predetermined relation with the notch 16 in said disc representing the first imprinting position upon each succeeding form. Upon continued rotation of the disc 15 stud 72 engages a projecting end of the catch 70 to rock said catch in a clockwise direction (Figs. 3 and 4) thereby removing the opposite end of the catch from engagement within the shoulder of lift lever 68. Removal of the catch 70 therefrom permits return of lift lever 68 to its normal position under influence of spring 73, thereby permitting pawl 44 to return to normal engagement with the periphery of the spacing disc 15, whereupon the pawl 44 enters the approaching notch 16 to arrest the feeding mechanism with the first record receiving position on a succeeding form length in registry with the imprinting position of the imprinting machine.

During operation of the lift lever 68 as a result of the manual operation of the compensating lever 61, motor 23 is fully energized by closing of the switch 50 through operation of the spacing disc pawl 44.

Figure 7:
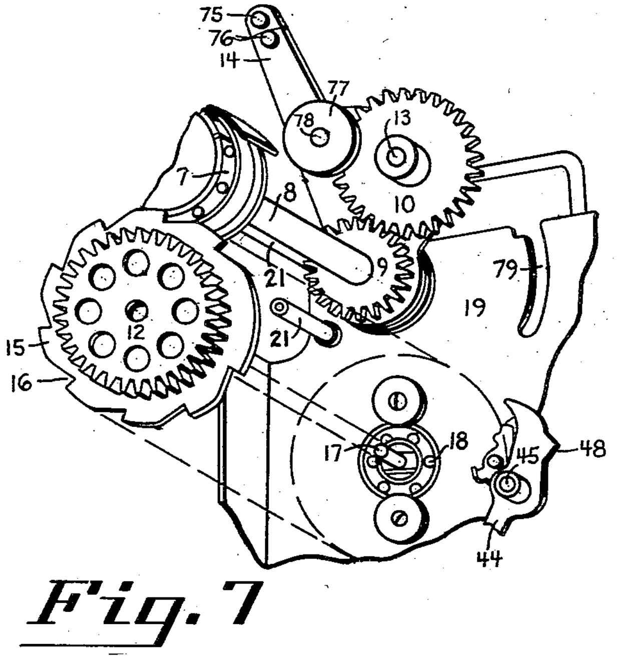
Fig. 7 is an exploded view of a part of Fig. 5, showing the method of changing control discs.

Adjustment of the instant feeding mechanism to handle forms of different lengths, or to alter the extent of strip feed intermediate succeeding line spaces, it is only necessary to remove the spacing disc 15 and associated gear 12. Such operation is clearly shown in Fig. 7, in which lever 14 is in upward inoperative position, carrying with it the compound gear 10—11. Movement of the lever 14 and gear 10—11 into such position completely clears the disc 15 and associated gear 12 for easy removal. So that other gears may be substituted for gear 12 and the lever 14, and associated gears maintained in proper position in relation thereto, the side plate 19 is provided with a series of perforations 74 with which spring pressed pins 75—76 carried by the lever 14 cooperate to locate the lever and associated gears in proper position. After proper location of the lever, it is locked in position by tightening thumb nut 77 upon screw stud 78 carried by lever 14. The opposite end of stud 78 is shouldered and freely passes up and down within the arcuate slot 79 in side plate 19, against which plate it is locked by the tightening of thumb nut 77.

Both sides of plate 19 are enclosed within cover members 56 and 80, the motor 23 and mounting bracket **25*a* being enclosed within cover member 81, while the space intermediate plates 19 and 25 is enclosed by the cover 82**.

To enable manual adjustment of the pin wheel shaft 8 and pin wheel units 7, the shaft 8 is extended through side plate 19 and its covers, with a hand control knob 83 applied thereto.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described our invention, we claim:

1. A strip feeding apparatus for intermittently advancing a continuous strip of series connected detachable record forms including a strip feeding device engageable with the record strip, intermittently operated actuating means therefor, movable means for arresting said actuating means, and an intermittently energized source of power for the actuating means controlled by said movable means so as to be energized prior to operation of the actuating means and deenergized prior to arrest of the actuating means.

2. A strip feeding apparatus for intermittently advancing a continuous strip of series connected detachable record forms including an intermittently operated strip feeding device for the strip, an intermittently energized source of power for the strip feeding device, and a movable common control member for the strip feeding device and the power source movable in one direction to activate the power source and then the strip feeding device and movable in the opposite direction to deactivate first the power source and finally the strip feeding device.

3. In an automatically operated indicia recording machine, a strip feeding mechanism for intermittently advancing a strip of series connected detachable record forms past a record receiving position, including an intermittently operated strip feeding device for the strip, an intermittently energized source of power for the strip feeding device, an oscillatory control member common to the strip feeding device and power source for controlling operation of both by virtue of its oscillatory motion in each direction, and means for automatically oscillating said control member in timed relation with the automatic operation of the recording machine.

4. In an automatically operated indicia recording machine, a strip feeding mechanism for intermittently advancing a strip of series connected detachable record forms past a record receiving position, including a strip feeding device engageable with the record strip, actuating means therefor, control means for the strip actuating means for advancing the strip through progressive step by step increments, a compensating mechanism whereby the control means may be temporarily disabled to permit continuous advancement of the strip by the strip actuating means, an automatic trip mechanism for reestablishing the control means at a predetermined point in the advancement of the strip, an intermittently energized power source for the strip feeding mechanism and means for energizing and deenergizing said power source in advance of the operation and arrest of the strip feeding mechanism.

5. In a strip feeding mechanism for a recording machine, a strip feeding device for progressively advancing a continuous strip of series connected detachable record forms past a recording position, an independent source of power for said strip feeding device, drive mechanism for the strip feeding device providing intermittent step by step movement thereof, common control means for said drive mechanism and the independent source of power for the strip feeding device having motion in opposed senses and effecting a control operation of said drive mechanism and said power source during motion in each of said senses, and means for automatically actuating the common control means in timed relation with the operation of the recording machine.

6. A strip feeding mechanism for a recording and imprinting machine of the type wherein a continuous strip of series connected detachable record forms are progressively advanced past a recording position through intermittent step by step movements, including strip feeding means, an oscillatory spring biased detent engageable therewith to intermittently arrest the motion of the strip feeding means, an independent source of power for the strip feeding means energization of which is under the control of the oscillatory detent, the construction and arrangement being such that oscillation of the detent energizes the source of power prior to release of the strip feeding means, an oscillatory lever temporarily engageable with the detent to oscillate the detent against the yielding resistance of its spring bias, an actuator for said lever energized in timed relation with the operation of the recording machine, and means for holding the detent in power energizing and strip feeding release position for a predetermined period after which the detent is free to successively deenergize the power source and engage the strip feeding means under influence of its spring bias to thereby arrest further motion of the strip feeding means.

7. In a strip feeding mechanism for intermittently advancing a continuous strip of series connected detachable record forms past a recording position in progressive step by step movements, a strip feeding device, dual control means therefor comprising a normally arrested power transmission means and an intermittently energized source of power therefor, actuating means for said control means operative to energize said source of power prior to release of the power transmission means, and a friction clutch between said power source and said power transmission means.

8. In an indicia recording and imprinting machine, a strip feeding mechanism for progressively advancing a continuous strip of series connected detachable record forms past imprinting position in a step by step movement, including a strip feeding device engageable with the record strip, a power transmission mechanism therefor, a detent therefor intermittently engageable with the power transmission mechanism for arresting operation thereof, a source of power for said power transmission mechanism, means for energizing said source of power prior to withdrawal of the detent from the power transmission mechanism, and means for actuating said detent in timed relation with the operation of the imprinting machine.

9. In an indicia recording and imprinting machine, a strip feeding mechanism for progressively advancing a continuous strip of series connected detachable record forms past imprinting position in a step by step movement, including a strip feeding device engageable with the record strip, a power transmission mechanism therefor, a detent therefor intermittently engageable with the power transmission mechanism for arresting operation thereof, an intermittently energized source of power for said power transmission mechanism, and detent controlled means for deenergizing said source of power prior to arrest of the power transmission mechanism by the engagement therewith of the detent.

10. In an imprinting and recording machine wherein a continuous strip of series connected detachable record forms are intermittently advanced past recording position, an intermittently actuated strip feeding mechanism engageable with the continuous record strip, dual control means therefor including a detent intermittently engageable with the strip feeding mechanism to arrest and permit operation thereof in timed relation with the operation of the imprinting machine, and an intermittently energized actuating means for the strip feeding mechanism energized and deenergized under control of said detent in predetermined timed relation with the operation of the imprinting machine, the energized periods of the actuating means being different than the operative periods thereof as controlled by the detent.

11. In an imprinting and recording machine wherein a continuous strip of series connected detachable record forms are intermittently advanced past recording position, an intermittently actuated strip feeding mechanism engageable with the continuous record strip, dual control means therefor including a detent intermittently engageable with the strip feeding mechanism to arrest and permit operation thereof in timed relation with the operation of the imprinting machine, intermittently energized actuating means for the strip feeding mechanism energized and deenergized under control of said detent in predetermined timed relation with the operation of the imprinting machine, the actuating means being deenergized prior to arrest of the strip feeding mechanism by engagement of the detent therewith, and means for controlling operation of the detent for controlling energization and operation of the actuating means and strip feeding mechanism in timed relation with operation of the imprinting machine.

References Cited in the file of this patent

UNITED STATES PATENTS

| | | |
|---|---|---|
| Re. 14,237 | Sundstrand | Dec. 26, 1916 |
| 1,687,587 | Pearne et al. | Oct. 16, 1928 |
| 1,925,735 | Sundstrand | Sept. 5, 1933 |
| 1,967,044 | Van Den Eynde | July 17, 1934 |
| 2,242,674 | Holt | May 20, 1941 |
| 2,327,377 | Sherman | Aug. 24, 1943 |
| 2,368,001 | Cooper | Jan. 23, 1945 |
| 2,394,312 | Krell | Feb. 5, 1946 |
| 2,492,979 | Freer | Jan. 3, 1950 |